(12) United States Patent
Davis et al.

(10) Patent No.: US 7,706,320 B2
(45) Date of Patent: Apr. 27, 2010

(54) MESH BASED/TOWER BASED NETWORK

(75) Inventors: James S. Davis, Woodstock, GA (US); Tom Meek, Doraville, GA (US)

(73) Assignee: Hunt Technologies, LLC, Pequot Lakes, MN (US)

( * ) Notice: Subject to any disclaimer, the term of this patent is extended or adjusted under 35 U.S.C. 154(b) by 313 days.

(21) Appl. No.: 11/588,715

(22) Filed: Oct. 27, 2006

(65) Prior Publication Data

US 2007/0116021 A1    May 24, 2007

Related U.S. Application Data

(60) Provisional application No. 60/731,217, filed on Oct. 28, 2005.

(51) Int. Cl.
*H04B 7/204* (2006.01)
*H04B 7/00* (2006.01)

(52) U.S. Cl. ............... 370/325; 370/328; 370/338; 455/41.2

(58) Field of Classification Search ......... 370/338, 370/401, 254, 310, 332, 325, 328; 455/41.2
See application file for complete search history.

(56) References Cited

U.S. PATENT DOCUMENTS

| | | | | |
|---|---|---|---|---|
| 6,329,902 B1 * | 12/2001 | Lee et al. | ............ | 340/7.27 |
| 6,735,448 B1 * | 5/2004 | Krishnamurthy et al. | ..... | 455/522 |
| 7,061,925 B2 * | 6/2006 | Joshi | ............ | 370/401 |
| 7,336,642 B2 * | 2/2008 | Rich et al. | ............ | 370/348 |
| 7,554,998 B2 * | 6/2009 | Simonsson et al. | ......... | 370/406 |
| 2002/0181427 A1 * | 12/2002 | Sparr et al. | ............ | 370/338 |
| 2004/0014491 A1 * | 1/2004 | Weigand | ............ | 455/552.1 |
| 2004/0224695 A1 * | 11/2004 | Schloemer | ............ | 455/446 |
| 2004/0264379 A1 * | 12/2004 | Srikrishna et al. | ......... | 370/238 |
| 2005/0030968 A1 * | 2/2005 | Rich et al. | ............ | 370/449 |
| 2005/0192727 A1 * | 9/2005 | Shostak et al. | ........... | 701/37 |
| 2005/0201340 A1 * | 9/2005 | Wang et al. | ............ | 370/337 |
| 2005/0249215 A1 * | 11/2005 | Kelsey et al. | ............ | 370/392 |
| 2006/0056370 A1 * | 3/2006 | Hancock et al. | ........... | 370/338 |
| 2006/0126611 A1 * | 6/2006 | Kelly et al. | ............ | 370/389 |
| 2006/0187884 A1 * | 8/2006 | Ma et al. | ............ | 370/332 |
| 2006/0215581 A1 * | 9/2006 | Castagnoli | ............ | 370/254 |
| 2006/0215582 A1 * | 9/2006 | Castagnoli et al. | ......... | 370/254 |
| 2006/0215583 A1 * | 9/2006 | Castagnoli | ............ | 370/254 |
| 2007/0008925 A1 * | 1/2007 | Dravida et al. | ............ | 370/331 |
| 2007/0280192 A1 * | 12/2007 | Yagyu et al. | ............ | 370/349 |
| 2008/0002599 A1 * | 1/2008 | Yau et al. | ............ | 370/310 |
| 2008/0069029 A1 * | 3/2008 | Chow | ............ | 370/328 |

* cited by examiner

*Primary Examiner*—Dwayne D. Bost
*Assistant Examiner*—Chhean Thao
(74) *Attorney, Agent, or Firm*—Thomas, Kayden, Horstemeyer & Risley, LLP (57) ABSTRACT

Included are embodiments for providing communications services. At least one embodiment includes a first communications component configured to receive data from a first communications device and a second communications component configured to send at least a portion of the received data to a second communications device.

18 Claims, 6 Drawing Sheets

MESH BASED/TOWER BASED NETWORK

TECHNICAL FIELD

This application claims priority to U.S. Provisional Application Ser. No. 60/731,217, which is entitled, "Mesh Based/Tower Based Network" as filed on Oct. 28, 2005, which is entirely incorporated by reference.

BACKGROUND

As wireless communications have evolved, the desire for increased reception and range has also evolved. Users operating communications devices often desire reception with a wireless communications network from anywhere in the world. In response to this demand, many communications networks and communications devices have increased signal power. While increasing power may somewhat increase reception and/or range for communications between a communications device and the communications network, this strategy may have a reduced effect in many cases including those where line of sight (and/or quasi-line of site) technologies are utilized.

Additionally, simply increasing signal power may also have a limited effect in point-to-multipoint communications networks, as the central communications point may be located at a place that is out of range to one or more communications devices.

DETAILED DESCRIPTION

Described in this disclosure are embodiments that include features, functionality, and advantages of a mesh based network, including but not limited to multiple communication routes and frequency hopping. Additionally included are embodiments for gaining a decibel link budget by combining mesh based communication on sub-layers with a first order point to multipoint link where the collection device is situated at an elevated location above local clutter to enhance range. In such configurations, range may be further enhanced through sub-layer mesh operation.

Figure 1:
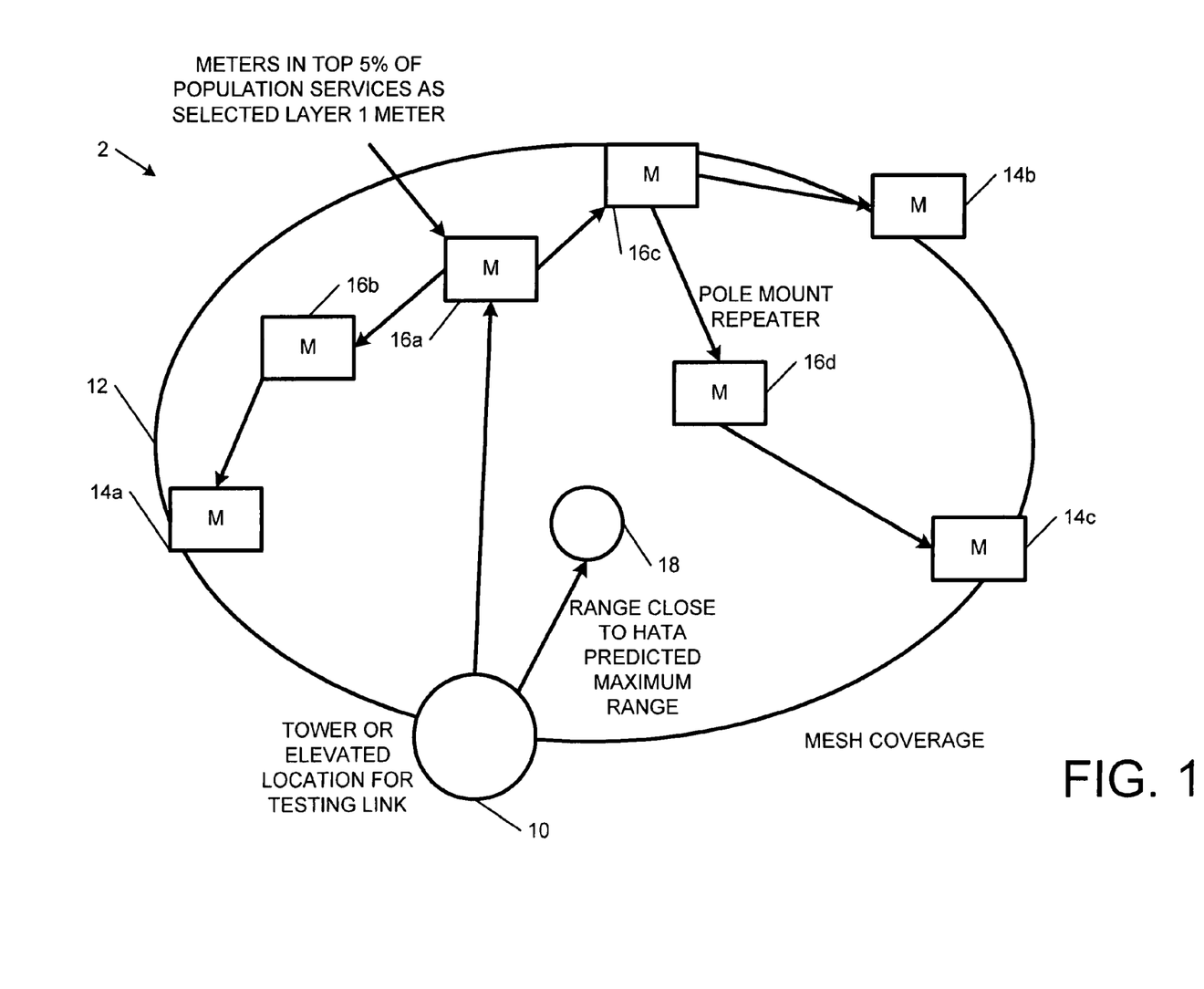
FIG. 1 is a block diagram illustrating an exemplary embodiment of a network configuration for communicating data between a communications device and a communications point.

FIG. 1 is a block diagram illustrating an exemplary embodiment of a network configuration for communicating data between a communications device and a communications point. As illustrated in the nonlimiting example of FIG. 1, network 2 may be configured to select particular Layer 1 communication devices 14, 16 (e.g., meter points) by a higher than mesh-based Received Signal Strength Indication (RSSI) measurement threshold. This may include selecting a small proportion of the total communications devices 14, 16 that may communicate with the elevated communications point 10. Such a configuration may result in a high degree of integrity in the Layer 1 links to enhance range, traffic handling, and interference protection. Additionally, merely raising the height of the communications point 10 (e.g., intelligent node data collector) may enhance raw range.

As another nonlimiting example, the communications devices 16 in Layer 1 may be selected based on an RSSI value, as interference protection to about 5% of the communications devices 14, 16 approaches the coverage area 12. This may assist in defining Layer 1. Additionally, the minimum RSSI value may be such that connectivity is configured to receive 80% of the transmissions from the total communications devices 14, 16 served (mesh and Layer 1 combined).

The above configuration may facilitate reduction of radio fading losses and location based path loss variation losses in a communications point based at an elevated location. An elevated communications point 10 may include positioning the communications point 10 at a location above local obstructions where standard propagation macro models apply. By selecting a desired communicating multipoint and routing a substantial number of less well communicating points through this optimal multipoint communications devices 16, losses may be reduced.

In at least one exemplary embodiment, communications data may be routed via a mesh network. However, in such a configuration, the optimal Layer 1 communications devices 14, 16 may be selected on the basis of best RSSI signal strength with the elevated central data collection position.

Additionally, a COST setting may be treated as being similar to a squelch, where signals below a certain threshold may be rejected at the communications point 10. The COST setting to receive the 5% of optimally disposed Layer 1 communications devices 14, 16 may be higher than the COST setting for receiving 50% of Layer 1 communications devices 14, 16. Depending on the particular embodiment this difference may be around 10 to 20 dB. This may enable better interference rejection for the elevated communications point 10. Additionally, the COST could be set as high as −80 dBm or even −60 dBm instead of the −100 dBm that might be used for a utility pole top device receiver. The Layer 1 meter point end receiver may have a lower probability of extreme interference levels and may therefore use a lower COST.

Additionally, communications point 10 may be configured to define coverage area 12. Communications point 10 may include a tower and/or may be configured at an elevated location for a testing link. Communications point 10 may determine one or more communications devices 16 for initiating communications. More specifically, in at least one nonlimiting example, communications point 10 may be configured to determine whether communications device 16a is suited for facilitating communications with other communications devices 14, 16. This determination may be made based on relative location of communications device 16a and/or other factors, such as the capabilities of communications device 16a.

Upon selecting communications device 16a, communications point 10 may send data to other communications devices via communications device 16a. As a nonlimiting example, data may be sent to communications device 16b and communications device 16c via communications device 16a. Similarly, data may be sent to communications device 14a via communications device 16b. Additionally, data may be sent to communications device 14b via 16c. Data may be sent to communications device 16d via communications device 16c and to communications device 14c via communications device 16d.

One should note that in at least one exemplary embodiment communications point 10 may be configured with logic for determining a facilitator communications device 16 for facilitating data communications to other communications devices 14, 16. More specifically, in at least one nonlimiting example, communications point 10 may be configured to determine that data sent to communications device 14c is sent to communications devices 16a, 16c, 16d, and then to communications device 14c.

Similarly, some exemplary embodiments may be configured such that communications devices 14, 16 include logic for determining a facilitator communications device 16 for the next transmission. More specifically, in at least one nonlimiting example, communications point 10 may be configured to send data to communications device 16a. Communications point may determine that a communications device 16a may be utilized for sending data to other communications devices 14, 16. The communications point 10 may then send data associated with a plurality of communications devices (e.g., communications devices 14a, 14b, and 14c) to communications device 16a.

Upon receiving the data, communications device 16a may determine that the data associated with communications device 14a may be sent to communications device 14a via communications device 16b. Upon receiving the data, communications device 16b may determine that the data may be sent directly to communications device 14a.

Additionally, in some exemplary embodiments, communications point 10 may be configured to determine a potential routing scheme. Upon receiving the data, however, communications devices 14, 16 may be configured to amend the routing scheme. As a nonlimiting example, if one or more of the communications devices 14, 16 in the routing scheme leave coverage area 12, the routing scheme may be amended such that the data can be efficiently communicated to the desired termination point.

One should note that inclusion of one or more of the embodiments discussed above may increase connectivity of network components via an elevated communications point 10 and/or utilization of the mesh coverage described above. Additionally, depending on the particular configuration, utilization of these and/or other features may extend network connectivity beyond coverage area 12.

Figure 2:
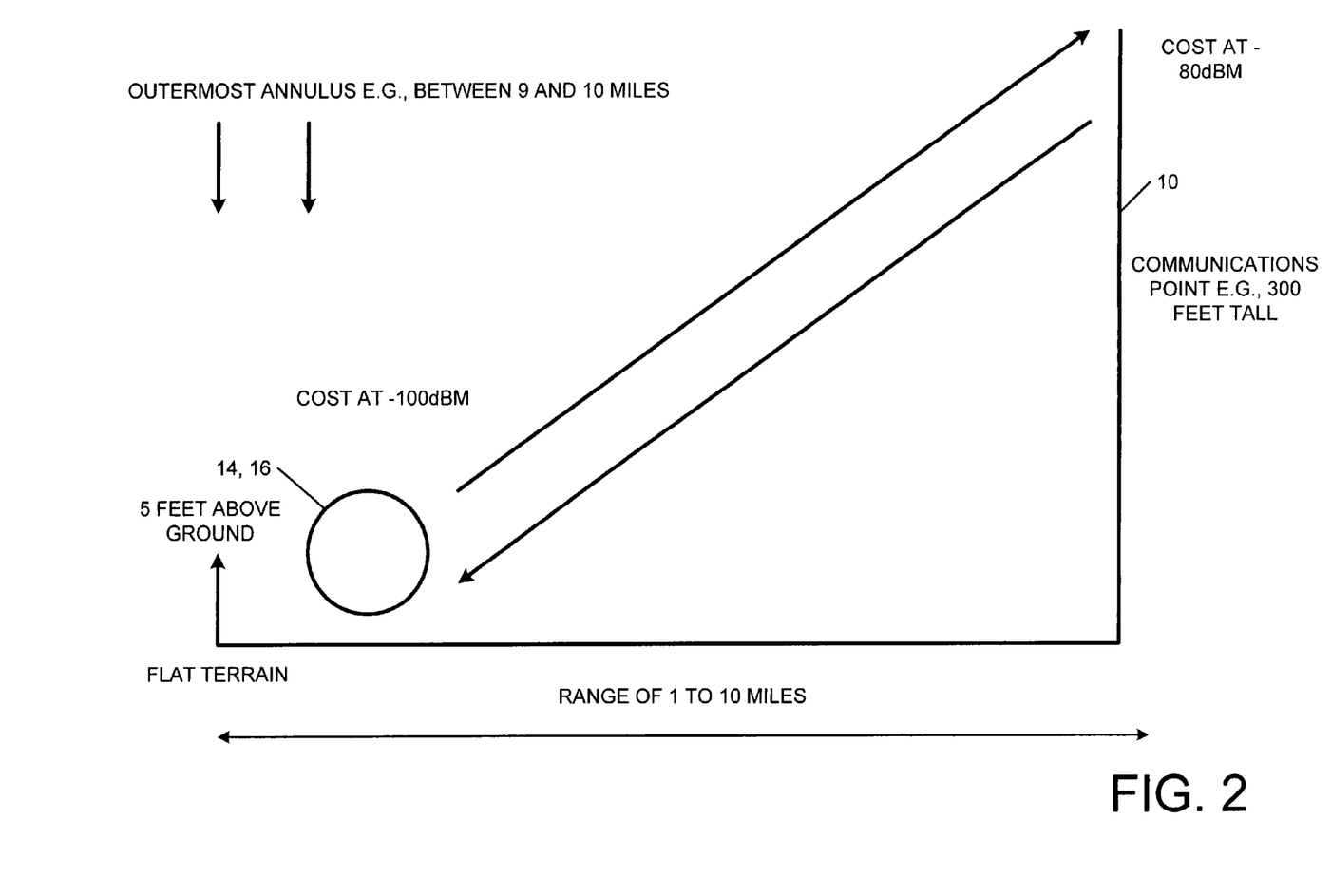
FIG. 2 is a diagram illustrating exemplary ranges for communication between a communications device and a communications point from FIG. 1.

FIG. 2 is a diagram illustrating exemplary ranges for communication between a communications device and a communications point from FIG. 1. As illustrated in the nonlimiting example of FIG. 2, communications point 10 may be coupled to Layer 1 via a meter link. The COST may be set to select the top 5% of all communications devices 14, 16 as Layer 1 meters in the outermost annulus (see 22a, 22b, FIG. 3) of the coverage area. In at least one exemplary embodiment, this may range from 1 to 10 miles, depending on actual level of interference and whether the cell area is in a predominantly urban, suburban or rural scenario. Additionally, the exemplary embodiment of FIG. 2 illustrates that communications device 14, 16 is currently positioned 5 feet above ground, which is merely a nonlimiting example.

Figure 3:
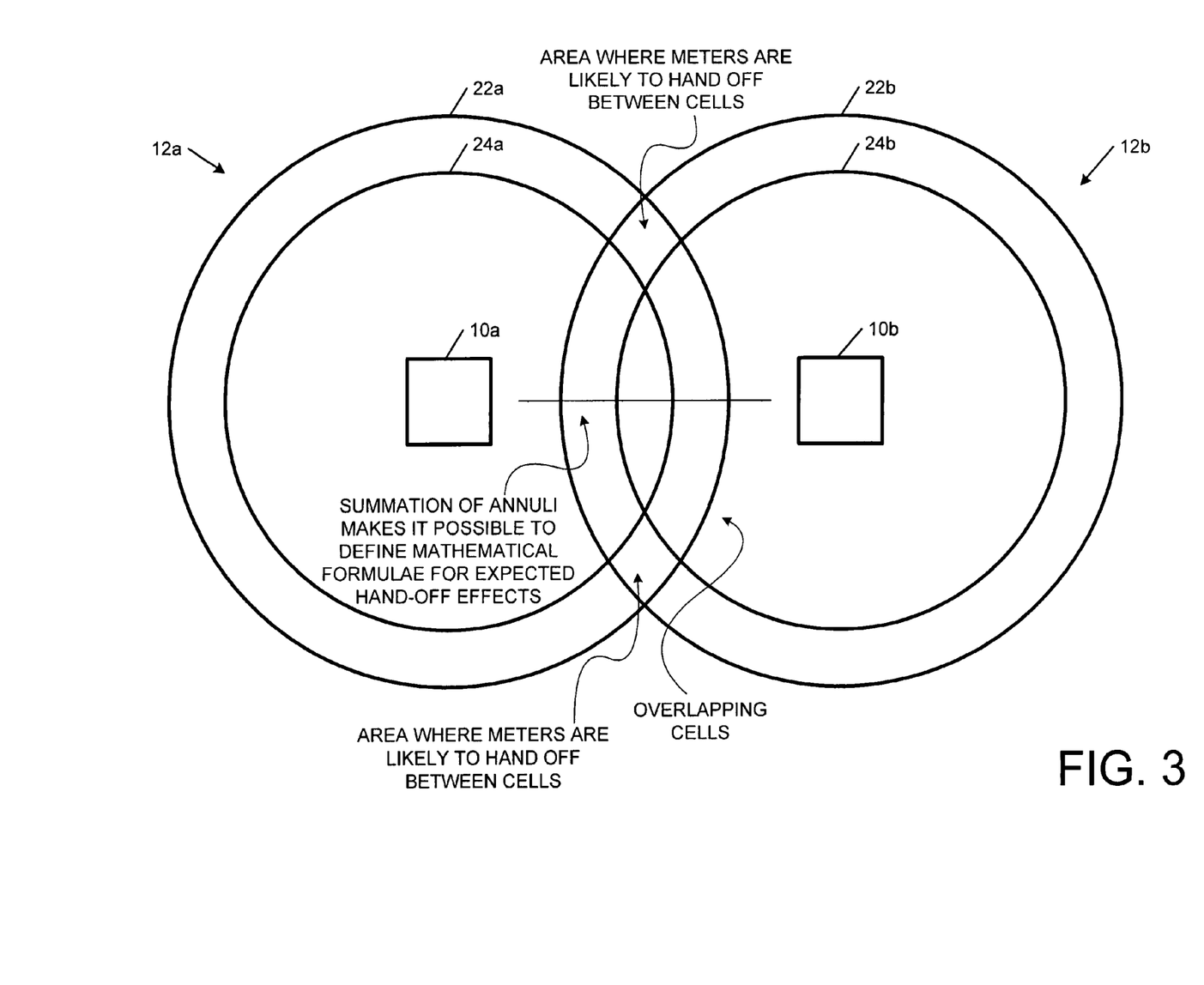
FIG. 3 is a diagram illustrating an exemplary embodiment of a plurality of communications points, similar to the communications points from FIG. 1.

FIG. 3 is a diagram illustrating an exemplary embodiment of a plurality of communications points, similar to the communications points from FIG. 1. As illustrated in the nonlimiting example of FIG. 3, communications point 10a may create a coverage area 12a. Coverage area 12a may have annuli 22a, 24a. Similarly, communications point 10b may create a coverage area 12b, as defined by annuli 22b, 24b.

According to the nonlimiting example of FIG. 3, the COST for the elevated communications point 10a may be set dynamically on an occasional update to reflect changing propagation and interference patterns to the highest threshold consistent with bringing in the Layer 1 communication device 14, 16. This may facilitate the highest interference protection for the specific channel in question. The elevated communications point 10a, additionally may occasionally test the link against the interference sensed by the communications point 10.

If the communications point 10a receives a response from the Layer 1 communications device 14, 16 (not shown in this drawing) that is close to the edge 22a (outermost annulus) of its service area, the communications point 10a may ping this link. Pinging the link in such a scenario may be practical because the link may be unbalanced in favor of the downlink (normally lower COST setting). If the communications point 10a determines the interference is too high to consistently receive a ping response from communications device 14, 16, a procedure for a handoff to a neighboring cell 12b may be initiated.

In a configuration that uses a frequency hopping spread spectrum of 50 or more channels, the elevated communications point 10 may check interference on each channel and adjust a COST for each channel. In the situation of marginal operation and/or where certain channels have a high level of COST for the communications point 10 to communicate with allocated Layer 1 communications devices 14, 16 on that channel, the communications point 10 may instruct those Layer 1 communications devices 14, 16 to transmit the missing uplink information on the remaining channels that are available. This may result in a reduced, but reliable, stream of traffic from the marginal Layer 1 communications devices 14, 16 to the elevated location. Significantly locked out channels may become another criterion for determining hand off to a neighboring cell.

While the embodiments disclosed herein discuss communications environments for communicating in any of a plurality of communications mediums and/or protocols, the antennas in a cell phone system may be sectionized to give a 3 cell repeat pattern on each 120 degrees of azimuth view from the communications point 10. Embodiments of this disclosure may be configured to utilize an OMNI and/or COLINEAR communications point 10, where stable mounting near the top and/or on a suitably light antenna structure is available. Sectionized antennas as groups of 3 or greater may be used in cases where the elevation structure may be a building or heavy mast structure. Use of such a configuration in the Industrial, Scientific, and Medical (ISM) band may be configured to respect the regulations for having an upper antenna gain limit of 6 dBi where a full Watt of power may be available as a drive for the antenna.

Where sectored antennas are employed, their use may not only increase capacity, but may also increase the ability for azimuth interference rejection. As an extension to the description above, where each hop channel is measured dynamically for interference level, a similar technique may be employed on one or more channels and each sectored antenna within that channel. This may provide further interference protection at the elevated site that might prevent hand off of marginal meters to another communications point 10.

Additionally, embodiments of this disclosure may be configured with specified layers from communications devices 14, 16, through repeaters 18 to a final layer of a selected (Layer 1) repeater 18, where the final Layer 1 is not constrained by the relatively unknown propagation criteria of sub-rooftop to sub-rooftop radio communication. While some mesh networks may be constrained to reliable operating ranges of a few thousand feet for each relay link, because of the asymptotic increase in Radio Frequency (RF) penetration loss involved with radiating RF signals through heavy clutter loss (e.g., adverse terrain, buildings, and foliage), others may not be so limited.

Additionally, some point to multipoint systems where one or both ends of the links are elevated may be configured as either quasi line of site (LOS) links or traverse a set amount of clutter loss at the low (or mobile) end of the link. These configurations may obey propagation models that are quantified in the mobile radio and cell-phone industry field. A model, among others, that may be used for embodiments disclosed herein is the Okumura Hata model, which may be applied down to a minimum mast height of 90 feet.

Thus, embodiments disclosed herein may have a several mile range, rather than a range of 100-1000 feet. Additionally, coverage requirements for television broadcast transmitters are generally 50%. Coverage requirements for a mobile system may generally be around 95%. Thus, mobile systems may demand a further fade factor equal to 1.9*Sigma, where Sigma is the dB mean variance of a radio fading distribution as defined by a normal or log normal distribution (a Log Normal distribution is a normal distribution where the abscissa is a dB or logarithmic term).

Often in mobile radio practice, Sigma equates to 5.5 dB. So about 9 dB greater margin may be allowed for mobile radio coverage than standard television coverage. This is because mobile units may be configured to move through fades without a loss or drop out of the communications link. Alternatively, a television receiver can have an associated antenna moved to a higher location or a more favorable location to gain good reception.

In an Automated Meter Reading (AMR) configuration, which may be a quasi-static radio scenario (similar to television), there may not be an option to move the remote unit or communications device antenna. The individual communications device 14, 16 may be configured to send and receive data in real time and the scope for resending the transmission by an Automatic Repeat Request (ARQ) technique is limited both in scope and in the timing available within the restricted bandwidth. Therefore, a predetermined mobile fading factor may be desired. This situation is further exacerbated by the presence of Raleigh distributed fast fades, in addition to the substantively time invariant lognormal fades.

The use of a mesh configuration may be utilized as a solution to the problem of providing very high RF coverage in the order of 99% by obviating the increasing of the radio signal by a substantial amount to provide this fading factor. If 95% coverage is satisfactory, as a nonlimiting example, the overall improvement through mesh may be around 20 dB or more, when additional effects such as lumped clutter loss factors (e.g., adverse terrain, large buildings, etc.) are taken into account.

In at least one configuration, 5% of Layer 1 communications devices 14, 16 are utilized and the sub-layers reach down into the clutter and capture communications devices 14, 16 that are in the bottom 5% or 1% of signal measurements. As such, the dB improvement brought about by a mesh configuration on an extended distribution that includes Raleigh local fading effects and block azimuth effects (e.g., large buildings, adverse terrain, etc.) could well be in excess of a 20 dB improvement and even approach 40 dB. Caution may be used, however of balancing this potential range enhancement against restricting the squelch or COST level of the receiver to a reasonably high dB level to restrict the ingress of enhanced levels of interference at the elevated location, as compared with receivers at the Layer 1 communications devices 14, 16 end of the link.

Figure 4:
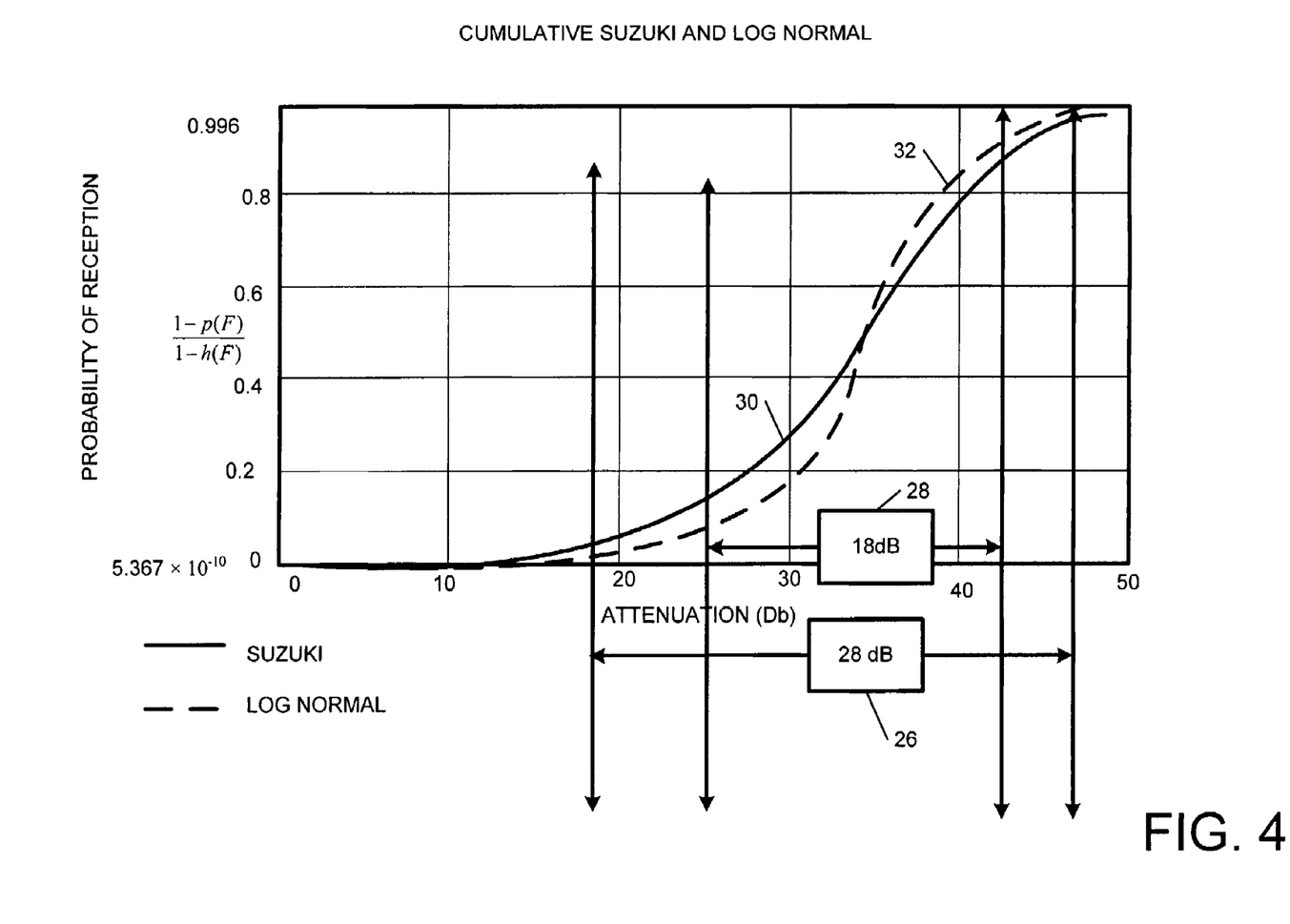
FIG. 4 is an exemplary graphical representation, illustrating reception characteristics that may be achieved through use of a network configuration, such as the network configuration from FIG. 1.

FIG. 4 is an exemplary graphical representation, illustrating reception characteristics that may be achieved through use of a network configuration, such as the network configuration from FIG. 1. As illustrated in the nonlimiting example of FIG. 4, the difference in dB between 5% and 95% coverage for Log Normal and Log Normal+Raleigh Fading distribution as anticipated primary link budget gain through use of sub-layer mesh may be achieved via embodiments disclosed herein.

This increase in range may exceed that available from the aggregated range to central collection point of a typical mesh system. Additionally, once the relayed range is greater than about 10 hop ranges in a mesh system, the protocols involved and the routing algorithms used to optimize the path back to the data collector may become complex. The hop range for the reasons already discussed may, in some embodiments, not exceed 1000 feet for many communications device to communications device scenarios, especially in higher density urban areas. Assuming a highly efficient routing algorithm, in some embodiments, an upper range of 2 miles may be achieved through 20 to 30 hops. However in addition to complexity, such a large number of hops may introduce significant capacity and timing issues even in the case where most transmissions are initiated at a remote communications device node.

Another link, which may be to an elevated location, can have a range of several miles in that link alone. A satisfactory and possibly saturated enhancement effect from the sub-layer mesh may further enhance the range possible from this link, or if compared with point-to-multipoint embodiments configured for tower based AMR systems, may offer a 10 dB improvement over ones that offer a small and rudimentary degree of alternate paths through meters and repeaters (20 dB mesh enhancement–10 dB rudimentary alternate path enhancement). Taking small cell flip-phones that operate at 0.25 watts Effective Radiated Power (ERP) and –80 dBm weighted receive level, the enhanced mesh aided AMR system disclosed herein may offer 0.5 watt and a very enhanced level of –110 dBm actual operating sensitivity where the mesh configuration has removed the necessary fading compensation factors to make this low level of operation a possibility.

This indicates that a range enhancement of 300%-400% is possible, enabling an Adaptive MultiRate (AMR) system to be superposed on a fairly incomplete selection of communications points 10 for a given cell phone system and yet provide a high degree of coverage. The presence of interference may, however, pare back the practical sensitivity of the elevated collection point to –90/–80 dBm on certain spread spectrum frequency hops at least.

Cell phone systems may be configured to employ directional and/or sectored antennas with gains up to 15 dBi. The regulatory environment of the present system limits antenna gain to 6 dBi so the apparent range increase of the AMR application with respect to cell phones may need to be reduced by up to 9 dB because of the stricter gain limit of the antennas. However, the predicted mesh gain of 18 to 40 dB may still bring about an improvement in coverage overlap as compared with mobile.

Additionally, the mesh enhancement effect of 20 dB may be present in any local pocket of communications devices 14, 16 that are AMR deployed. For partial deployments, pole mount repeaters could be installed to bring about the mesh enhancements in a fairly effective manner. A single pole mount repeating device may be effective as a Layer 1 launch point to the tower since there may be a 15 dB enhancement between communications device 14, 16 height and pole height in this nonlimiting example. These devices could be removed or just no longer maintained once the "pocket" or area in question comes to be fully deployed. An important point to note is that if communications devices are deployed, as for a pocket network with an infrastructure of pole mount data collection devices, the same enhancements would apply but without the pole mount data collection infrastructure being necessary.

At least one exemplary embodiment may be configured with highly overlapped cell coverage where meters within one cell tower may be configured to transmit in a substantively synchronized manner. The remote points may maintain accurate timing through downlink time synch and/or broadcast messages from RF elevated data collectors. A receiver for an atomic clock standard may be mounted in the data collector and used to maintain a very accurate time standard within the cell. If a mesh configuration is employed, where devices form their own network (see FIG. 1), an ordered initiate and response type of system could be used where packets are broken into specific time slots throughout the hour.

Similarly, because of the multiplicity of Layer 1 devices 14, 16 communicating up to the elevated site and the likely large number of communications devices 14, 16 that may be placed in an ordered initiation, a degree of contention could be allowed to exist where a percentage of packets are lost or delayed, due to transmission contention. This may be similar to a slotted aloha contention algorithm, but in reality, may be based on a Poisson process, where collision losses could be defined by annuli of meters sitting inside or outside a defined dB capture ratio criterion. The end effect may be similar to an aloha maximum channel utilization of 0.38 (or a maximum 38% of channel throughput when a 100% of channel utilization is requested, 62% of the offered traffic is lost in collisions), etc.

Exemplary embodiments of a complete cellular system overlay may be configured to not employ the complex repeat patterns of a cell phone network. However, a technique in Frequency Hopping Spread Spectrum (FHSS) of using a staggered 50 channel random hopping plan (and/or other configuration) may be used.

At least one exemplary embodiment disclosed herein may be configured to use a Spread Spectrum system as a means of increasing allowed power output. This may be implemented by configuring the system to occupy a single frequency for no more than 400 ms and to have the system cycle in a pattern of 50 or more channels in a random and equally divided duty cycle across the 50 channels. There may be scope for selecting certain channels as an interference protection at the expense of capacity handling as discussed above. Consideration to having greater than 50 channels available and alternate hopping patterns may alleviate this traffic bottleneck, but the hop channels should still be as wide as possible within the given spectrum to maximize coverage improvements through frequency diversity.

Some mesh systems include a second tier of data collectors, one or more of which may be defined as a Local Area Network (LAN). A Wide Area Network (WAN) may then used to interconnect LAN hubs to a hardwire Internet Protocol collection point. This is typically a service such as provided by a General Packet Radio Signal (GPRS), from wireless service providers.

Similarly, at least one exemplary embodiment disclosed herein may be configured to replace the LAN and bring the WAN down to the meter (communications device) level. The mesh system may be configured to dynamically apply this and implies no hardware difference between a Layer 1 and a sub-layer meter. Additionally, restriction to the roles of a given endpoint interchanging between Layer 1 and sub-layer may be absent. As such, there may be no definition for a LAN to WAN bridge in this embodiment. As a nonlimiting example, a grouping of radio isolated meters (communications devices 14, 16) within a metal-framed commercial building, as the dynamic nature of the mesh architecture may be utilized.

Figure 5:
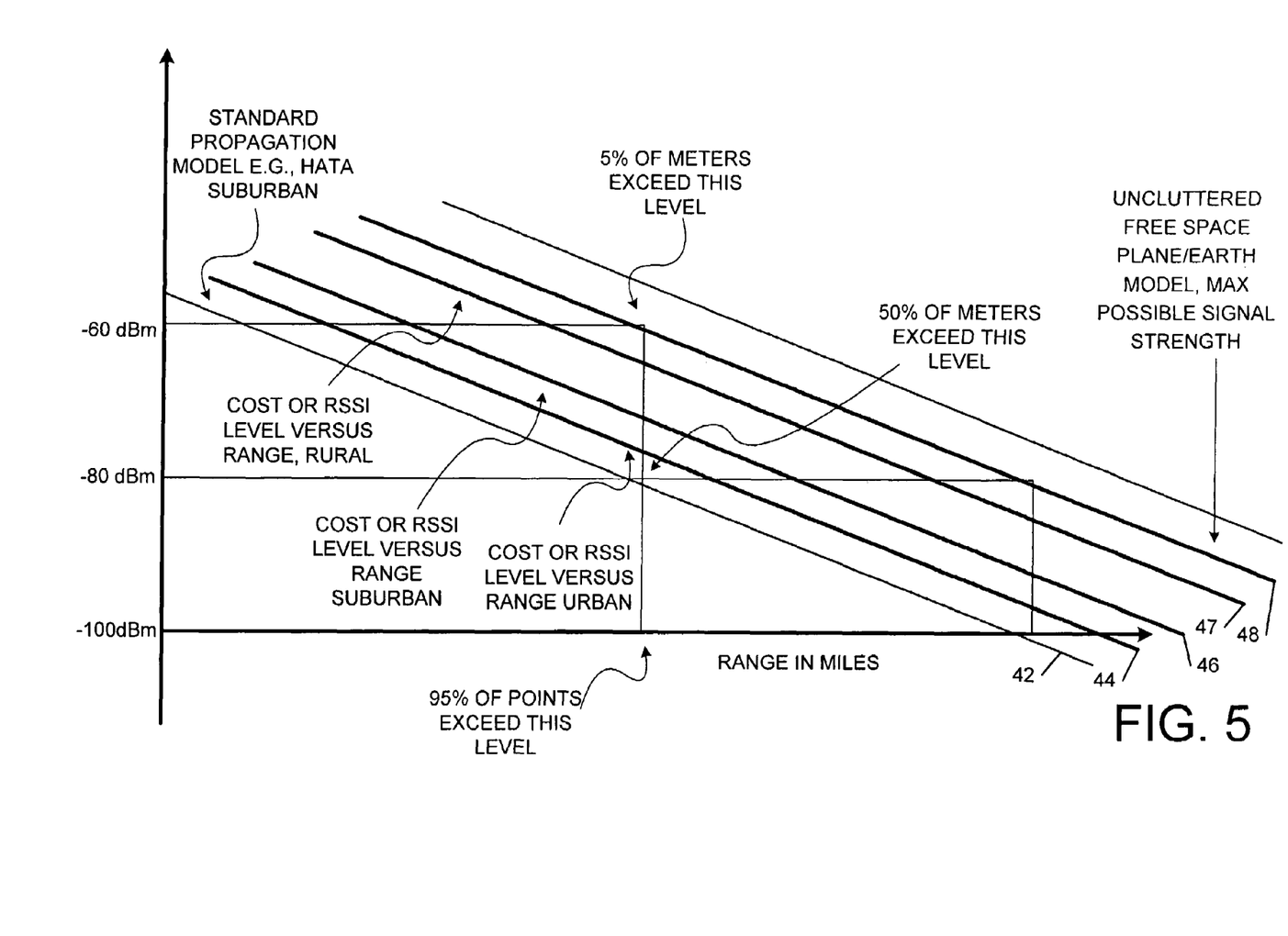
FIG. 5 is an exemplary graphical representation of performance related to locales that may be achieved in a network, such as the network configuration from FIG. 1.

FIG. 5 is an exemplary graphical representation of performance related to locales that may be achieved in a network, such as the network configuration from FIG. 1. As illustrated in the nonlimiting example of FIG. 5, a standard propagation model (e.g., hata suburban) representation 42 may be configured to represent power level in dBm versus a range in miles in a suburban area. Similarly, representation 44 may be configured to illustrate a cost or RSSI level versus range in an urban setting. Representation 46 may be configured to illustrate a cost or RSSI level versus range in a suburban setting. Representation 47 may be configured to illustrate a cost or RSSI level versus range in a rural area. Representation 48 may be configured to illustrate a cost or RSSI uncluttered free space (e.g., plane/earth model). Representation 48 may be configured to illustrate a maximum signal strength for at least one embodiment disclosed herein.

The Hata formula computes for urban path loss (e.g., downtown Tokyo). The path loss for a typical 300 ft. high tower to a meter 5 foot above ground for 7 miles range is illustrated in the Okumura Hata Formula below.

$d := 7$ $$d := d \cdot \frac{8}{5}$$

range in miles
 f:=916.5 frequency in MHz
 h:=300 height of transmitter in feet $$h := \frac{h}{3.3}$$

m:=1.5 height or receiver in meters
 am receiver height equation/variable
 am:=(1.1 log(t)−0.7)m−(1.56 log(f)−0.8)
 L:=69.55+26.6 log(f)−13.82 log(h)−am+(44.9-6.55 log(h))log(d)
 L=154.908 path Loss in dB When a 1-Watt transmitter is used through a 6 dBi gain antenna, the received signals are:

$R_{max}$=−77.275 Maximum RF signal computed from free space Plane/Earth path loss.
 $R_{rur}$=−75.323 Computed from a model for top 5% of meters (communications devices) in a rural environment allowing a 15 db gain factor.
 $R_{sub}$=−93.917 Computed from a model for top 5% of meters in suburban allowing a 1.5 dB gain factor.
 $R_{urb}$=−103.908 Computed from a model for top 5% of meters in an urban environment allowing a 1.5 dB gain factor.

Therefore, a −80 dBm receiver threshold could be used for the rural case for a 7-mile range. The same transmitter and tower at 2.3 miles may yield the following results.

$R_{max}$=−57.94 Maximum RF signal computed from Free Space Plane/Earth path loss.

$R_{rur}$=−59.821 Computed from a model for top 5% of meters in a rural environment allowing a 15 dB gain factor.

$R_{sub}$=−78.415 Computed from a model for top 5% of meters in a suburban environment allowing a 15 dB gain factor.

$R_{urb}$=−88.406 Computed from model for top 5% of meters in an urban environment allowing a 15 dB gain factor.

Therefore a suburban scenario would allow a −80 dB COST threshold for this range, the rural scenario, if there is heavy interference, could use a cut off of −60 dBm. Assuming a maximum density to be classified as urban to be 2000. Such a nonlimiting example may yield the following results.

Area:=πd²
M=2000
N:=M(Area)
N=3.324×10⁴

33,000 meters could be covered from one collection device.

For an urban scenario up to 20,000 meters per sq mile and 1.1 mile range:

$R_{max}$=−45.127 Maximum possible RF signal computed from Free Space Plane/Earth path loss.

$R_{rur}$=−49.547 Computed from a model for top 5% of meters in a rural environment allowing a 15 dB gain factor.

$R_{sub}$=−68.142 Computed from a model for top 5% of meters in a suburban environment allowing a 15 dB gain factor.

$R_{urb}$=−78.132 Computed from a model for top 5% of meters in an urban environment allowing a 15 dB gain factor.

At this range, the urban environment could use an interference threshold of −80 dBm, (−70 dBm for suburban) and around 80,000 meters could be covered.

Below is an exemplary calculation of SLOTTED (Synchronized) ALOHA max throughput on a cell for a simple modulation scheme.

n:=1 . . . 1000
L:=0.4 Packet duration in seconds, does not exceed one channel hop
T:=0.01 nL Throughput Offered.
$V_n$:=1·$T_n$ Number of packets in one second
m:=$v_n$·1 Probability of overlap $$P_n := \frac{m_n}{1} \cdot e^{\frac{-m_n}{1.4}}$$

The system throughput may be somewhat superior to a slotted aloha limit of 0.38 maximum throughput because of the Frequency Modulated (FM) capture effect.

Certain modulation schemes such as ones that use coding trellis's (16 way Quadrature Amplitude Modulation (QAM), simple Viterbi encoding etc.) may be configured to result in considerably lower Eb/NO for a given Bit Error Rate (BER) and thus may reduce FM capture effect to 1 or 2 dBs.

Figure 6:
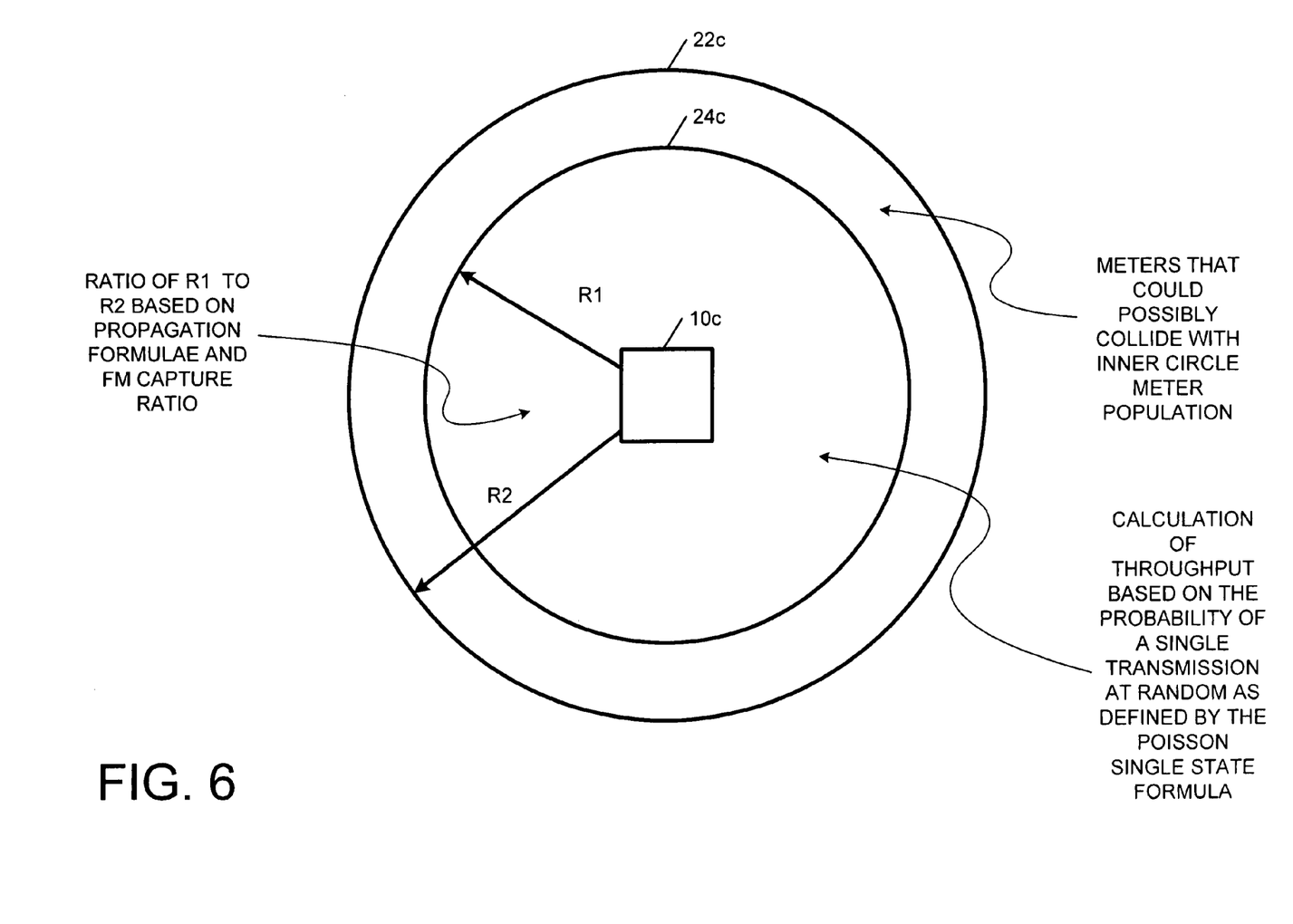
FIG. 6 is an exemplary embodiment of a communications point, illustrating a ratio based on propagation formulae, similar to the communications point from FIG. 1.

FIG. 6 is an exemplary embodiment of a communications point illustrating a ratio based on propagation formulae, similar to the communications point from FIG. 1. As illustrated in the nonlimiting example of FIG. 6, a communications point 10c may be configured to provide annuli 22c, 24c with radii of R2, R1, respectively. The ratio of R1 to R2 may be based on propagation formulae and FM capture ratio. Additionally, the area between annuli 22c, 24c may include an area where meters (e.g., communications devices 14, 16) could possibly collide. Inside R1 may include an area where calculation of throughput based on the probability of a single random transmission is defined by the Poisson single state formula.

The invention claimed is:

1. A method for communicating data between a communications device and an elevated communications point, comprising the steps of:
   selecting by the elevated communications point one or more communications devices geographically dispersed from the elevated communications point and having a communication indicator value that meets a predetermined threshold to be first layer communications devices;
   determining whether one or more of the first layer communications devices can facilitate communications with at least one additional communications device that is not a first layer communications device;
   determining by the elevated communications point a potential routing scheme for communicating data between the elevated communications point, a first layer communications device, and a recipient communications device that is not a first layer communications device;
   transmitting from the elevated communications point to a first layer communications device according to the potential routing scheme data intended for receipt by the recipient communications device that is thereafter retransmitted by the first layer communications device; and
   amending the potential routing scheme by a communications device contained in the potential routing scheme upon receipt of the data to optimize a communications path to the recipient communications device,
   wherein the elevated communications point further comprises at least one cost setting, where signals below the at least one cost setting are rejected at the elevated communications point and where signals above the at least one cost setting are accepted at the elevated communications point, the at least one cost setting being set intermittently based on changing propagation and interference patterns, and
   wherein a predetermined number of the one or more communications devices is maintained by the elevated communications point at a percentile of the one or more communication devices having the highest signal strength values.

2. The method of claim 1, wherein the predetermined threshold is established in correlation with communication indicator values received from a plurality of communications devices so a predetermined percentage of communications devices having a higher communication indicator values are selected as first layer communication devices.

3. The method of claim 1, wherein the predetermined threshold is the top five percent of communication indicator values for communications devices capable of communicating with the elevated communications point.

4. The method of claim 1, wherein the predetermined threshold is established as a predetermined percentage of communication indicator values for communications devices capable of communicating with the elevated communications point so as to optimize the integrity of communication links with first layer communications devices.

5. The method of claim 1, wherein the elevated communications point is located at least fifty times higher from the ground than an average height off the ground of a number of communications devices communicably coupled to the elevated communication point.

6. The method of claim 1, further comprising the steps of:
identifying a channel of communication of a plurality of channels of communication as not preferred for communication; and
instructing by the elevated communications point each of the first layer communications devices to transmit data to the elevated communications point on selected channels of communication that excludes the channel not preferred for communication.

7. The method of claim 1, wherein the elevated communication point has a wireless communicable range of approximately 10 miles.

8. A system for communicating data, comprising:
a base node located at an elevated position and configured to transmit and receive data wirelessly;
a plurality of communication devices geographically dispersed from the base node and capable to transmit and receive data wirelessly with other communication devices and the base node if positioned within a range of communication;
a first logical layer of communication devices selected from the plurality of communication devices by the base node, the first logical layer of communication devices having a signal strength indicator value within a predetermined percentile range of communication devices in the plurality of communication devices and one or more additional communication devices not on the first logical layer within a communication range;
one or more additional logical layers of communications devices each having at least one wireless communicable path to the base node through one communication device on the first logical layer of communication devices; and
a data transmission transmitted from the base node to a target communication device on one of the one or more additional logical layers of communication devices via one communication device on the first logical layer of communication devices, the data transmission containing predetermined routing information for routing the data transmission to the target communication device, wherein a communication device that receives the data transmission is configured to amend the routing information for routing the data transmission to the target device if communicating with the target device can be optimized by the communication device making the amendment to the routing information,
wherein the base node initiates a potential routing scheme for communicating data between the base node, the first logical layer of communications devices, and the one or more additional logical layers of communications devices, the base node further comprising at least one cost setting, where signals below the at least one cost setting are rejected at the base node and where signals above the at least one cost setting are accepted at the base node, the at least one cost setting being set intermittently based on changing propagation and interference patterns,
wherein the base node further comprises at least one cost setting, where signals below the at least one cost setting are rejected at the base node and where signals above the at least one cost setting are accepted at the base node, the at least one cost setting being set intermittently based on changing propagation and interference patterns, and
wherein a predetermined number of the plurality of communication devices is maintained by the base node at a percentile of the plurality of communication devices having the highest signal strength values.

9. The system of claim 8, wherein the predetermined percentile is about five percent.

10. The system of claim 8, wherein the predetermined percentile is established in correlation to a value that optimizes the integrity of wireless communication between the base node and the communication devices on the first logical layer of communications devices.

11. The system of claim 8, wherein the base node is elevated from the ground at a height that is at least fifty times higher in relationship to an average height from the ground of the plurality of communications devices.

12. The system of claim 8, wherein the base node identifies a communication channel that is not preferred for communication and instructs each communication device on the first layer of communication devices to communicate with the base node on a communication channel other than the communication channel not preferred for communication.

13. A method for a mesh network having an elevated access node, comprising the steps of:
establishing a predetermined number of qualified nodes from a plurality of communication nodes geographically dispersed from the elevated access node for direct two-way wireless communication with the elevated access node, whereby at least one communication node within the communicable range of the access node is rejected as a qualified node;
determining whether one or more of the qualified nodes can facilitate communications with at least one additional communications node that is not a qualified node;
determining at the access node a potential routing scheme for communicating data between the access node, a qualified node, and a target communications node, the access node further comprising at least one cost setting, wherein a signal meeting the at least one cost setting is accepted at the access node, the at least one cost setting being set intermittently based on changing propagation and interference patterns;
transmitting from the access node to a qualified node according to the potential routing scheme data intended for receipt by the target node that is thereafter retransmitted by the qualified node;
amending the potential routing scheme by a communications node identified in the potential routing scheme upon receipt of the data to optimize a communications path to the target node;
determining by the access node that interference meets a predetermined level; and
in response to determining by the access node that interference meets a predetermined level, transferring to a different qualified node the transmission from the access node, the different qualified node configured to receive the transmission from the access node and the different qualified node configured to send the transmission to at least one additional communications node that is not a qualified node,
wherein the elevated access node further comprises at least one cost setting, where signals below the at least one cost setting are rejected at the elevated access node and where signals above the at least one cost setting are accepted at the elevated access node, the at least one cost setting being set intermittently based on changing propagation and interference patterns, and wherein the predetermined number of qualified nodes is maintained by the elevated access node at a percentile of the plurality of communication nodes having the highest signal strength values.

14. The method of claim 13, wherein the elevated access node is elevated from the ground at a height that is at least fifty times higher in relationship to an average height from the ground of the plurality of communications nodes.

15. The method of claim 13, wherein the elevated access node identifies a communication channel that is not preferred for communication and instructs each qualified node to communicate with the elevated access node on a communication channel other than the communication channel not preferred for communication.

16. The method of claim 13, wherein the elevated access node has a communicable range of approximately 10 miles.

17. The method of claim 1, further comprising the steps of:
determining by the elevated communications point that interference meets a predetermined level; and
in response to determining by the elevated communications point that interference meets a predetermined level, transferring to a different first layer communications device the transmission from the elevated communications point, the different first layer communications device being able to receive the transmission from the elevated communications point and the different first layer communications device being able to send the transmission to at least one additional communications device that is not a first layer communications device.

18. The method of claim 13, wherein a signal not meeting the at least one cost setting is not accepted at the access node.

* * * * *